July 18, 1933.  P. A. KINZIE  1,919,165

VALVE

Filed Aug. 22, 1931  4 Sheets-Sheet 1

Inventor:
Phillip A. Kinzie,
By Byrnes Townsend & Potter
Attorneys.

July 18, 1933.  P. A. KINZIE  1,919,165
VALVE
Filed Aug. 22, 1931  4 Sheets-Sheet 2

Fig. 2.

Inventor:
Phillip A. Kinzie,
By Byrnes Townsend & Potter,
Attorneys.

July 18, 1933. P. A. KINZIE 1,919,165
VALVE
Filed Aug. 22, 1931 4 Sheets-Sheet 3

Patented July 18, 1933

1,919,165

UNITED STATES PATENT OFFICE

PHILLIP A. KINZIE, OF DENVER, COLORADO, ASSIGNOR TO UNIVERSAL HYDRAULIC CORPORATION, OF DENVER, COLORADO, A CORPORATION OF COLORADO

VALVE

Application filed August 22, 1931. Serial No. 558,794.

This invention relates to needle valves for the control of fluid in pipe lines and particularly to valves of relatively small size, that is from four to eight inches in diameter, in which a fluid under pressure is introduced into the casing of the valve to operate the valve. This application is intended as a companion to my pending application Ser. No. 462,109, filed June 18, 1930, and constitutes still further improvements and refinements over and above those revealed therein.

An object of the invention is to provide a simple, reliable, and economical needle valve of the polychambered type. A further object of the invention is to provide a valve which, when closed to prevent fluid flow, will be tight at all points with no leakage from the chambers either to the atmosphere or into the conduit or pipe line downstream from the valve seat. A still further object of my invention is to provide a valve which, when used within a pipe line, will, when closed, remain tight against flow of fluid in the opposite direction should a reversal of pressures within the pipe line upon opposite sides of the valve occur, such as a rise of pressure in the pipe line at the needle or outflow end of the valve, or a decrease of pressure in the pipe line at the opposite end of the valve.

These and other objects of the invention will be apparent when taken with the accompanying drawings in which.

Figure 2:
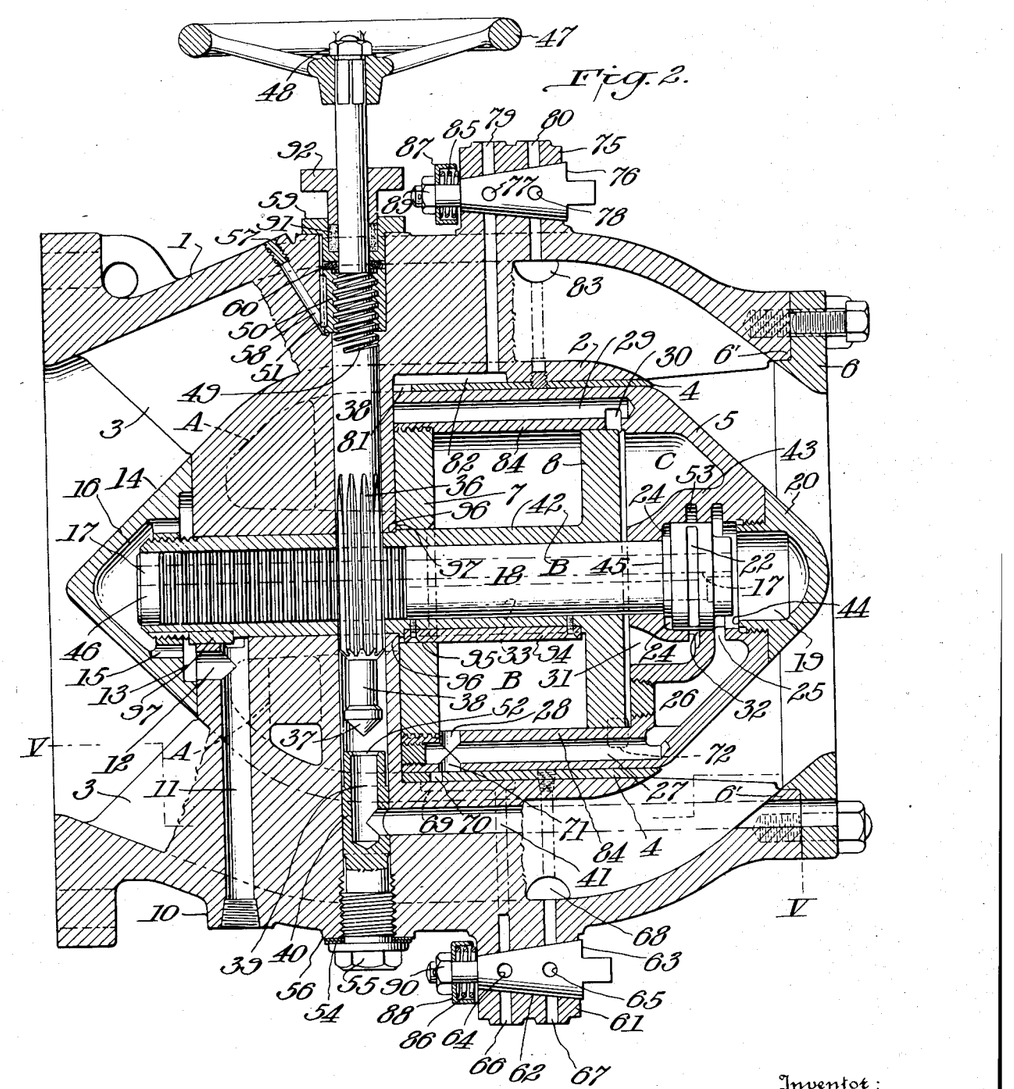
Fig. 2 is a vertical section of the assembled valve taken along section line 2—2 of Fig. 3.

Referring to Fig. 2, a longitudinal section is shown. The body 1 incloses a concentrically-positioned cylindrical casing 2 maintained in position by radial ribs 3 extending from its outer diameter to the inner walls of the body 1. The relatively opposing adjacent surfaces of the axially concentric body and casing are so curvedly shaped, as shown on the drawing, as to constitute an annular water passage-way through the valve favorable to smooth and even fluid flow.

The interior of the casing 2 is cylindrically bored from the outflow end of the valve to receive the anti-corrodible liner 4 which is suitably fastened therein. The liner 4 is in turn bored to telescopically receive the flow controlling needle 5 which, when moved axially to the right towards the outflow end of the valve, seats on the finished surface of seat ring 6 bolted to the face of the body 1 and held in position by the shoulder 6', and thereby closes the fluid passageway through the valve.

Three tandem-aligned, pressure-actuated, operating chambers are provided, consisting of the annular chamber A between the needle head 7 and the inflow end of the casing 2, the middle annular chamber B between the outflow face of needle head 7 and the inflow face of the fixed diaphragm 8 and the annular chamber C between the outflow face of the fixed diaphragm 8 and the adjacent interior conical wall of needle 5. The arrangement and purport of these chambers is similar to those described in the Patent No. 1,750,417 and I therefore will not describe these chambers in connection with this present invention.

From the above description it will be evident to those skilled in the art that pressure fluid introduced into chambers A and C will move the needle towards closed position, and that pressure fluid introduced into chamber B will move the needle towards open position.

Figure 1:
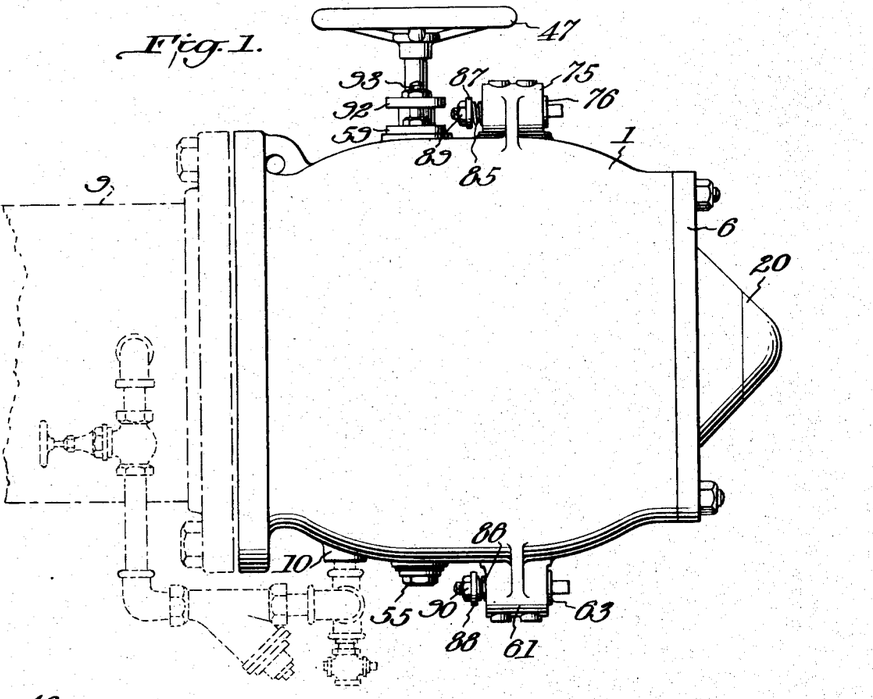
Fig. 1 is a side elevation of the valve, the discharge side being open to the atmosphere.

As shown in Fig. 1, pressure fluid is supplied from any suitable source, such as the pipe line 9, to the pressure connection 10 located upon the under side of the valve. The pressure fluid flowing upwards through the passages 11 and 12 enters the annular ring port 13 formed in the outflow face of the casing cap 14, and then flows through ports 15 into the conical cavity 16.

From the cavity 16 the pressure fluid flows through the drilled ports 17 in the controlling rack 18 to the downstream end of the controlling rack 18, where it enters the cavity 19 formed in the needle tip 20.

Figure 4:
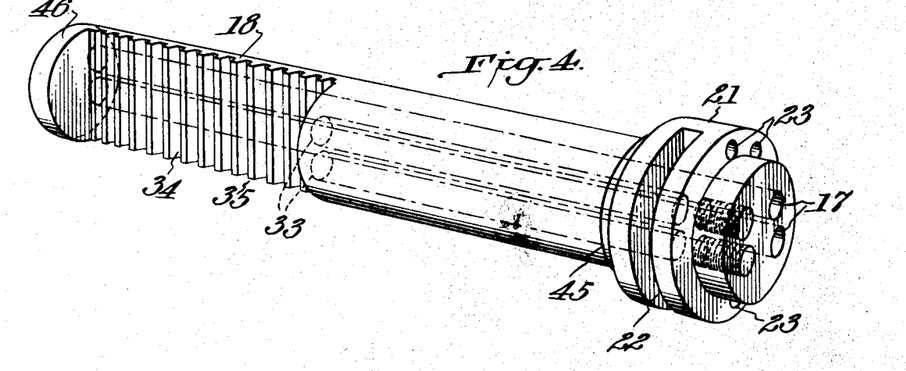
Fig. 4 is a perspective view of the controlling rack.
Figure 5:
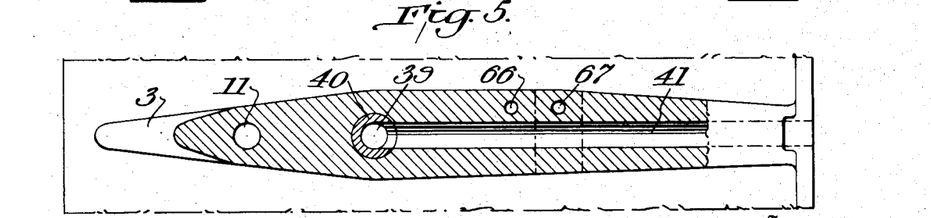
Fig. 5 is a section taken on the line 5—5 of Fig. 2.

Referring now to Fig. 4 showing a detail view of the controlling rack 18, it will be seen that the right-hand or down-stream end of this part is enlarged into a cylindrical controlling valve 21, having a deep slot 22 positioned midway of the axial length of cylindrical enlargement and at right angles thereto. A number of axially drilled ports 23 pass through the unslotted portion of controlling valve 21. Referring to Fig. 2, it is evident that the pressure fluid in the cavity 19 will pass through the ports 23 just described into the annular ring cavity 24 upon the upstream side of the controlling valve 21 of the controlling rack 18, and that the area of the slide valve 21 in the cavity 24 subjected to pressure tending to produce movement of controlling rack 18 towards the outflow end of the needle valve, plus the area of the upstream end of the controlling rack 18 exposed to fluid pressure in the cavity 16 is equal to the area of the outflow end faces of the controlling rack 18 exposed to the fluid pressure tending to produce upstream movement of the controlling rack 18. Therefore, the reactions of these pressures being in opposite directions and of equal amount, cause the controlling rack 18 to be in perfect hydraulic balance regardless of its position with reference to the ports contained in the tip of needle 5.

With the controlling rack 18 in the position shown in Fig. 2, the pressure fluid from cavity 19 flows directly into the annular port 25 to the cored passage 26, through the drilled ports 27 and 28 into the middle chamber B, where it acts upon the needle 5, tending to move it towards the upstream or open position. During the upstream movement of the needle 5, the chamber A is free to exhaust excess fluid through ports 29 and 30 into chamber C, which in turn exhausts through the cored port 31, the annular ring port 32 and into the slot 22 in the controlling valve 21. From the slot 22, the exhaust fluid passes into the two drilled ports 33 which communicate with slot 22 as shown in Fig. 4, and extend rearward to the milled out portion of controlling rack 18, where its shank is flattened for the rack teeth 34, forming cavity 35.

From the cavity 35 the exhaust fluid flows downwards through the spaces between the teeth of a rack pinion 36, around and past the conically shaped auxiliary valve 37 formed on the lower extremity of the pinion shaft 38, into the port 39 formed in the upper end of valve seat body 40, and thence horizontally through the drilled port 41 in one of the ribs 3, to the atmosphere at the discharge face of the seat ring 6.

Figure 8:
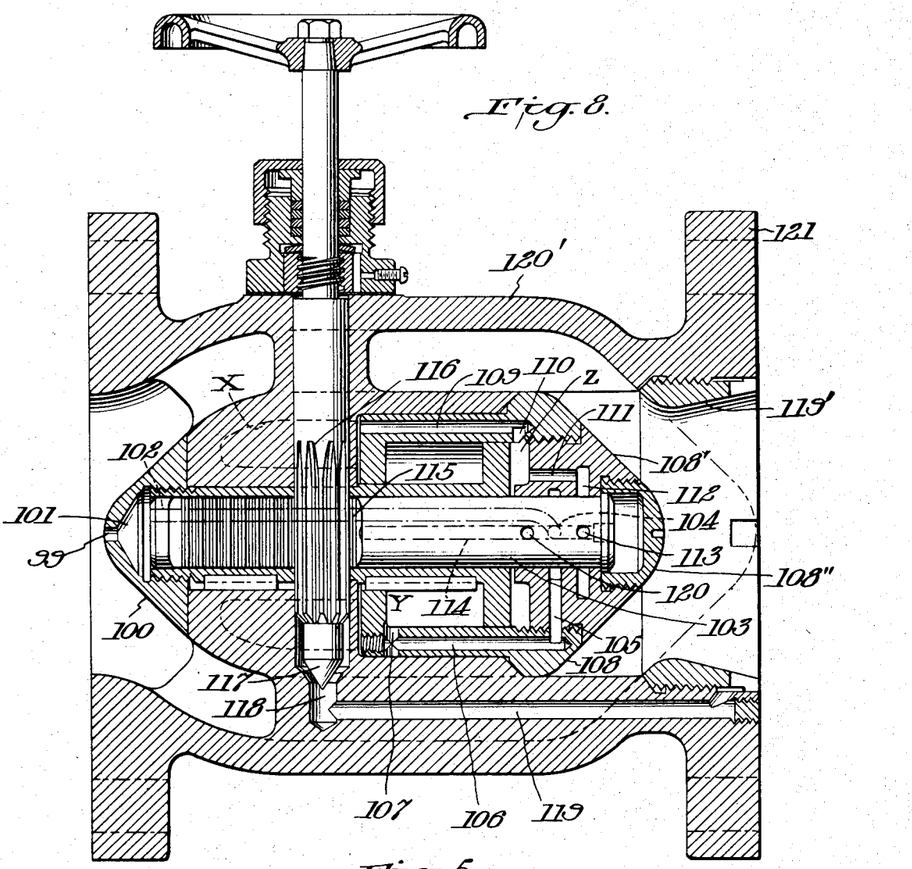
Fig. 8 is a vertical section of a modified form of the valve.

When used as a pipe line valve, the downstream end of this exhaust port can then be brought back into communication with the pipe line as in the modification shown in Fig. 8, thereby delivering all exhaust fluid into the pipe line downstream from the needle valve seat.

The shank of the controlling rack 18 is slidably carried within the diaphragm tube 42, and its forward portion including the controlling valve 21, already described, is slidably carried within the ported boss 43 contained within the outflow end of needle 5. The upstream end of the needle tip 20 forms a stop limiting the downstream axial sliding movement of the controlling rack 18 by the outflow face of its controlling valve 21 coming into contact with the opposingly positioned shoulder 44 of the tip 20. The shoulder 45 on the controlling rack 18 likewise comes into contact with the upstream wall or face of the cavity 24 and is thereby restrained from further upstream movement with respect to the needle 5.

The rearward or upstream shank portion of the controlling rack 18 is provided with a barrier 46 which prevents the flow of the pressure fluid from the cavity 16 into the cavity 35.

The rack pinion 36 is mounted within body 1 for manual rotation by means of a handwheel 47 which is keyed to the top of the pinion shaft 38 and maintained in place by a nut 48. The pinion shaft 38 is provided with a threaded portion 49 about midway of its length and is threadedly engaged within a fixed nut 50, restrained from rotation by a key 51, so that rotation of the handwheel 47 results in axial as well as rotative movement of the pinion and pinion shaft.

Downward axial movement of the pinion shaft 38 is limited by the auxiliary valve 37 formed upon its lower end, engaging with the seat 52. Upward axial movement of the pinion shaft 38 is limited by the amount of counter-clockwise rotation permitted by the upstream travel of the controlling rack 18 whose teeth 34 mesh with the teeth of the pinion 36. From the foregoing, it is evident that rotation of the hand wheel 47 results in rotative and axial movement of the pinion 36 and corresponding axial movement of the controlling rack 18. Axial movement of the controlling rack 18 causes slotted port 22 in the controlling valve 21 to shift so that it will either register with the port 32 in boss 43, or with the port 25, as shown in Fig. 2. From this it will be seen that whenever the controlling rack 18 is moved forward by means of the handwheel 47 as above described, until the slotted port 22 registers with the annular ring port 25, the fluid in the chamber B will be exhausted to atmosphere or into the conduit as the case may be, through the ports 28, 27, 26, 25, 22, 33, 39 and 41, and the chambers C and A will have pressure fluid introduced into each of them from cavity 19, through the ports 23, annular ring cavity 24, ring port 32, port 31 and into chamber C, from which it passes through ports 30 and 29 into chamber A. The pressure fluid so introduced into the chambers C and A acts upon the needle 5 tending to move it towards the seat 6 and so close the valve, as has already been described in an earlier part of this specification.

From the above, it is evident that clockwise rotation of handwheel 47 so positions the ports in the controlling valve 21 as to introduce fluid pressure into chambers A and C and exhaust the pressure fluid from the chamber B, thereby producing a closing movement of needle 5, and that, conversely, counter-clockwise movement of the handwheel 47 reverses the relative positions of the control ports so as to introduce pressure fluid into chamber B, and to exhaust the pressure fluid from the chambers A and C, thereby producing upstream or opening movement of the needle 5. It is also evident that if, after rotating handwheel 47 and so causing the needle 5 to move towards either the open or closed position as the case may be, the manual operation of turning the handwheel is discontinued, the needle 5 will move but a relatively short distance further before the now shifting positions of the control ports 25 and 32 in the moving needle tip will have shifted their relative positions with reference to the port 22 in the now stationary controlling rack 18 sufficiently to establish a hydraulic balance of forces between chamber B and chambers A and C, which will cause the needle to come to rest. Thus, by moving handwheel 47 in the proper direction, the operator can not only close and open the valve completely, but he can also set the needle for any partial opening desired as well.

Should the operator desire to open or close the valve when there is little or no pressure in the pipe line, or when the pipe line is dry, he can do so manually by running the handwheel, thereby causing the controlling rack 18, through its controlling valve 21, to bear against the shoulder 44 and so push the needle 5 towards the closed position, or, by turning the handwheel 47 in the opposite direction, cause the shoulder 45 on the control rack 18 to bear against the upstream wall face of the cavity 24 and so pull the needle 5 towards the open position. By this means the valve can be manually opened or closed or set in any partially opened or throttling position.

As already described above, clockwise rotation of hand wheel 47 produces closing movement of needle 5 and downward movement of rack pinion 36, which seats the valve 37 on its seat 52. When the valve 37 is seated, it is essential that the needle 5 should be seated on its seat 6, thus tightly shutting off all flow through the valve or pipe line and all escape of liquid from the actuating chambers and the valve's interior as well.

To those skilled in the art, it will be at once perceived that while two pairs of mating machined surfaces can theoretically be brought into simultaneous engagement the precision of the machine work required to accomplish this is so difficult to secure that it is not practical for commercial purposes.

In this invention, the result desired, namely, bringing the valve 37 into tightly seated engagement with the seat 52, and simultaneously bringing the needle 5 into tightly seated engagement with the seat 6, is accomplished in the following manner:

With the valve completely assembled as shown in Fig. 2, with the exception of adjusting shims 54 and key 51, the keyway for which has not as yet been cut in the nut 50, the handwheel 47 is turned clockwise until the needle 5 is in close proximity to seat 6. A pair of thin shims are then interposed between the approaching surfaces of the needle 5 and the seat 6 on opposite sides of the diameters of these parts. The needle 5 is then moved in closing direction until it bears firmly against the two shims which in turn are pressed firmly against the seat 6, the shims thus maintaining a slight space between the seating surfaces of these two parts. The seat body 40 is then screwed into the body 1 until the seat 52 in its upper end cames into firm contact with the valve 37 on the pinion shaft 38. The space between the upper side of the flanged head 55 of the seat body 40 and the opposing finished boss 56 on body 1 is now gauged to determine the proper thickness of the adjusting shims 54 which are required. The seat body 40 is unscrewed from body 1, the shims 54 are placed in position and the seat body is then replaced in the body 1 and screwed tightly against the shims 54, with its seat 52 firmly engaged with the valve 37.

The plug 57 is now removed from hole 58, a drill inserted therein and the periphery of nut 50 is marked at its lower end by means of the drill, giving the correct location of keyway in the nut 50 to receive the key 51. The nut 50 is removed, the keyway for the key 51 is machined in alignment with the drill mark, the key 51 is inserted. and the parts are reassembled as shown in Fig. 2.

The two setting shims between needle 5 and seat 6 are now removed and the valve is ready to operate, except that the needle 5 and the seat 6 are separated from seating engagement by the thickness of the shims last mentioned.

The valve 37 is seated against the seat 52 and in order that the needle 5 can move into contact with the seat 6, it is essential that the pinion 36 be rotated clockwise still further, which would mean that the pinion shaft 38 would likewise move axially downward due to its threaded portion 49 turning in the fixed nut 50. But the pinion shaft 38 is restrained from further downward movement due to the valve 37 being firmly seated on the seat 52. Consequently, if the further rotation of the pinion 36 is necessary to force the needle 5 into engagement with the seat 6, then provision must be made for the nut 50 to move axially upwards. This movement is accomplished by slidably mounting the nut 50 and its key 51 within the body 1, and providing a resilient means between its upper end and the opposing lower face of the stuffing-box 59. This resilient means must have sufficient capacity to normally hold the nut 50 in its bottom position, and, when the need occurs, permit the nut 50 to rise sufficiently to compensate for the slight additional amount of rotation required to force the needle 5 against the seat 6 after the valve 37 has seated against the seat 52. A rubber washer, a coil spring or similar device may be interposed but preferably a spring 60 is used as shown in Fig. 2.

In order to avoid damage to the valve from freezing when not in operation, means are provided for draining the three interior chambers A, B, and C, and the water-passage between the inner and outer bodies of the valve, a boss 61 is cast on the bottom of the valve body 1. The drain plug 63 has two drilled holes 64 and 65 passing through it at right angles to its axis. Two corresponding holes 66 and 67 are drilled through boss 61. One hole 67 communicates with the opening 68 through the rib 3 and drains the water-passage through the valve. The other hole 66 communicates with the cored slot 69 in the inner cylinder wall of the valve casing 2. The cord slots 69 communicates with the drilled port 27 through a slotted hole 70 in the liner 4 and a drilled port 71 in needle 5 for draining cored passages 19 and 26 through ports 27, 71, 70, 69, 66 and 64.

Figures 3, 6, 7:
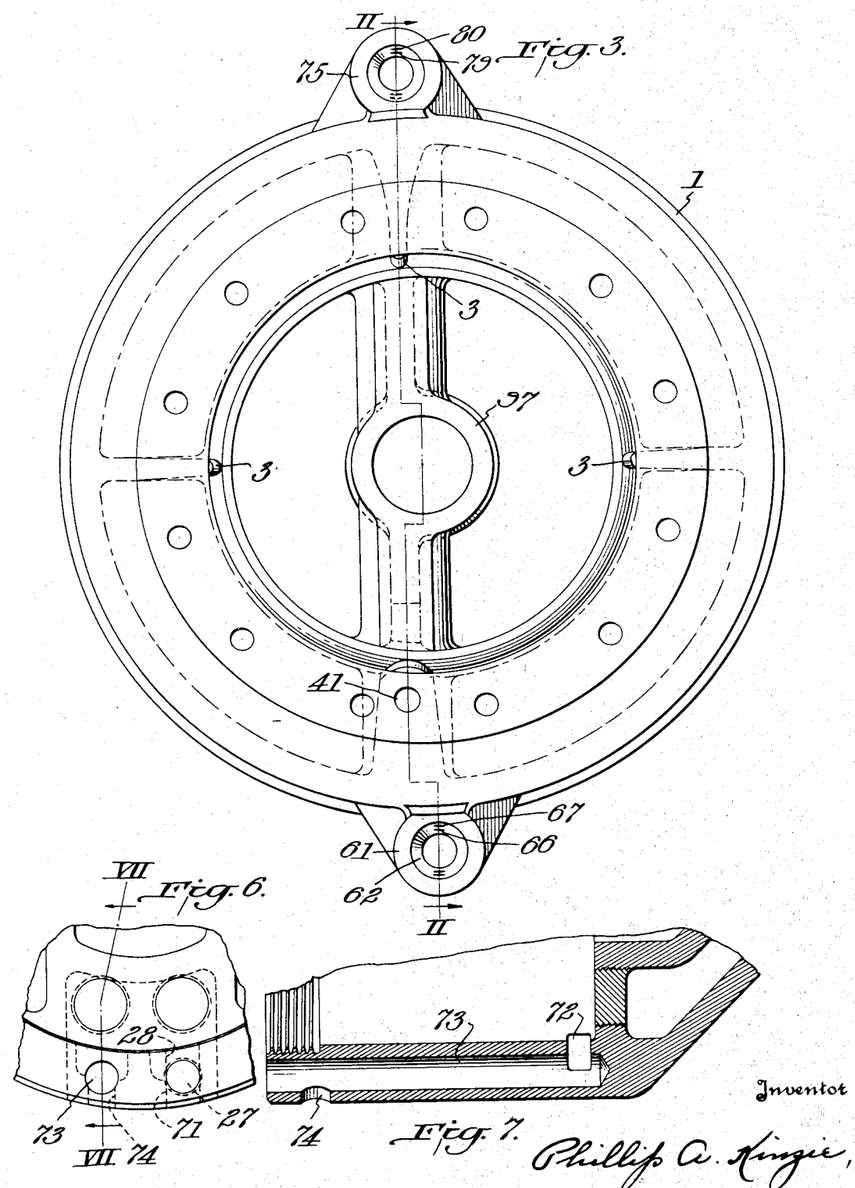
Fig. 3 is an end elevation of the valve casing as viewed from the outflow side of the valve.
Fig. 6 is an upstream end elevation of a portion of the valve needle.
Fig. 7 is a section taken on the section line 7—7 of Fig. 6.

The chamber C is drained through the cored port 72 into drilled ports 73 and 74, shown in Fig. 6, and thence through the ports 70, 69, 66 and 64. The chamber A drains through the drilled ports 73, 74, 70, 69, 66 and 64. It will be noted that the passage between drilled port 71 and slotted hole 70 is restricted to a very narrow opening; and that with needle 5 in the full-open position, the chamber B is in communication with the chamber A through the ports 28, 27, 71, 70, 74 and 73. This restricted opening is, however, of such a small area as not to interfere with operation either for opening or closing and is inoperative and does not affect maintaining the needle 5 in any intermediate position. If for any reason, due perhaps to inaccuracy in locating the ports 71, 70 or 74, this restricted opening should be made slightly wider than specified, the tendency would be to increase the pressure in the chambers A and C. In such a case, the needle would move toward the closed position a very small fraction of an inch and the restricted opening would close. The valve could then function normally, and such a small movement of the needle 5 toward closed position would not affect the discharge capacity of the valve.

When the valve is put into service at any time after having been drained, the needle should be moved to closed position by the mechanical means already described. Then by slowly turning the handwheel 47 in counter-clockwise direction the interior of the valve will fill, trapping the air contained within the empty valve. Means for venting this trapped air are provided.

A boss 75 and a vent plug 76 with two drilled holes 77 and 78, which communicate with the drilled holes 79 and 80, are located on top of the valve body 1. These parts are identical with those used for draining on the bottom of the valve. By turning the vent plug 76 one-quarter of a turn, the chamber C is vented through the cored port 30, the drilled collecting port 29, the slotted hole 81, the cored slot 82, and the drilled holes 79 and 77. The chamber A is vented directly through the slotted hole 81, the cored slot 82 and the drilled holes 79 and 77. The water-passage is vented directly through the drilled hole 80, which communicates with the cored opening 83 through the web 3 and with the drilled hole 78 in the vent plug 76. The trapped air from the chamber B can escape through the clearance between the diaphragm 8 and the internal wall 84 of the needle 5 into the chamber C, thence to the atmosphere as described above for venting the chamber C, through the ports 30, 29, 81, 82, 79 and 77.

The vent plug 76 and the drain plug 63 are held in fluid-tight engagement with their respective tapered seats by the coil springs 85 and 86 compressed between the end faces of the bosses 75 and 61 and the washers 87 and 88. The springs are retained in proper tension adjustment by the nuts 89 and 90 which are screwed to the threaded end extensions of the plugs.

The pinion shaft 38 of the rack pinion 36 is made fluid-tight where it emerges from the interior of the valve body 1, by means of a stuffing-box 59, containing suitable packing 91, which is compressed around the shaft in a conventional manner by the gland 92 through two studs 93 shown in Fig. 1, which, by means of double nuts, are made to serve a dual purpose; namely, the lower nuts maintain the stuffing-box 59 in fluid-tight engagement in valve body 1 and resist the upthrust of the spring 60, while the upper nuts 93 bear against the upper face of the gland 92.

The needle head 7 is rigidly attached to the rear or inflow end of needle 5 by suitable means such as bolts or as illustrated by a coarse thread around its periphery which engages a mating thread cut in the interior wall surface 84, and is restrained from rotational movement with respect to the needle 5 by a suitable locking screw. The needle head 7 is restrained from rotating on the diaphragm tube 42 on which it is slidably mounted, by a key 94 attached to the diaphragm tube. The key rests in a slot 95 in the needle head 7. With this arrangement, the key 94 prevents the needle 5 from rotating, and thereby maintains the correct alignment of the drain port 71 in the needle 5 with respect to the relative positions of the drain and vent ports in the liner 4 and in the valve body 1 already described.

The outer diameter of the diaphragm tube 42 is abruptly reduced at a point about midway of its length, forming a shoulder 96 which rests against the finished face of a boss 97 surrounding it. The upstream end of the reduced part of the diaphragm tube 42 is threaded to receive the threaded casing cap 14 which rests against the finished upstream face of the casing 2, and thereby maintains the shoulder 96 against the boss 97, locking the diaphragm tube 42 in its correct relationship with respect to the other parts of the valve. A key 97 is provided to prevent rotation of the diaphragm tube 42.

The valve hereinabove described is particularly appropriate for discharge into the open air. For valves intended to be inserted into pipe lines and the like, an alternative arrangement is shown in Fig. 8. This arrangement is particularly appropriate for valves of small as well as large size. Inasmuch as the basic principles involved are the same as those applied to the valve shown in Fig. 2, a simplified statement of the operation will suffice.

The pressure fluid enters the valve at its upstream side through an opening 99 in the casing cap 100. From the cavity 101, the fluid enters a port 102 in the control rack 103 and passes to the intake opening 104 in the overflow end of the control rack. In the position shown in Fig. 8, the intake opening 104 registers with the port 105. The pressure fluid then enters the port 105, passes through the ports 106 and 107 to the chamber Y to act upon the needle to move it to open position. The wall of the needle cylinder 108 is provided with ports 109 and 110 to exhaust fluid from chamber X into chamber Z, and the chamber Z in turn exhausts through the ports 111, 112 formed in the needle nose 108', the discharge opening 113, the port 114 into the exhaust fluid chamber 115. The discharge fluid in the chamber 115 passes between the teeth of the pinion 116 past the auxiliary valve 117 into cavity 118 and out through the port 119 to the pipe on the downstream side of the valve. In order to close the needle valve, the pinion 116 is rotated in a clockwise direction until the intake opening 104 on the control rack 103 registers with the port 112. At the same time, the discharge opening 120 will register with the port 105. With the openings in this position, pressure fluid from the cavity 101 passes through the port 102 to the intake port 104 through the ports 112 and 111 into the chamber Z and from the chamber Z through the ports 110 and 109 to the chamber X. The pressure fluid in the chambers Z and X acts on the needle valve and moves it to its closed position. During the closing movement, the exhaust fluid from the chamber Y passes through ports 107, 106, 105 to discharge opening 120 through the port 114 to the chamber 115 through the teeth of the pinion 116 past the auxiliary valve 117 to the cavity 118 and through the port 119 and into the fluid passage at the downstream side of the valve.

The needle, it is noted, is formed of the cup shaped needle cylinder 108, the needle nose 108', and the nose cap 108", all assembled as shown in Fig. 8. The needle seats upon the seat 119' which is threaded in the casing 120' and fits wholly within the casing to permit the valve as a whole to be secured to a pipe by the flange 121.

As in the case of the valve shown in Fig. 2, it is necessary to follow up the closing or opening movement of the needle 108 with a corresponding movement of the control rack 103, due to the changing positions of the openings in the control rack relative to the ports in the needle. It then follows that it is possible to maintain the needle at any intermediate position.

It will be obvious to those skilled in the art that this invention is not limited to valves of any particular size and that modifications may be made in details of construction of the parts and their relative arrangement without departing from the spirit of the invention, except as limited by the scope of the following claims.

I claim:

1. In a needle valve, the combination with a casing, a needle, pressure chambers, supply and exhaust passages for pressure fluid, and a distributing valve for controlling communication between said chambers and said passages, of operating means for said distributing valve, and valve means actuated by said operating means for closing said exhaust passage when said needle is in closed position, said valve means including a valve seat on said casing.

2. The invention as set forth in claim 1, wherein said operating means includes a rotary element for adjusting said distributing valve, and a shaft for said rotary element having a movable element of said valve means located thereon.

3. The invention as set forth in claim 1, wherein said operating means includes a pinion for adjusting said distributing valve, and a pinion shaft having a movable element of said valve means at the inner end thereof.

4. A valve adapted to be operated by fluid pressure having in combination, a pressure chamber, a flow controlling needle member, a seat for said needle member, means including an axially movable pinion for controlling the member, means to axially move the pinion on rotation thereof, an auxiliary valve, one closing surface of which is connected to the pinion, an adjustable seat for the auxiliary valve, and resilient means associated with the pinion, whereby the closing of the auxiliary valve having been co-ordinated by means of the adjustable seat with the seating of the flow controlling member, the pinion may be further rotated after its axial movement is stopped by the closing of the auxiliary valve, to seat the needle member.

5. A valve adapted to be operated by fluid pressure having in combination, a pressure chamber, a flow controlling needle member, a seat for the flow controlling member, means including a pinion and an axially movable pinion shaft for controlling the member, an auxiliary valve, one closing surface of which is provided on said pinion shaft, and an adjustable seat for the auxiliary valve, whereby the auxiliary valve may be made to close substantially at the same time that the needle member contacts with its seat.

6. In a needle valve, a casing, a needle, pressure chambers, supply and exhaust passages for pressure fluid, a distributing valve controlling communication between said chambers and passages, an auxiliary valve for said exhaust passage, and control means for simultaneously adjusting said distributing and exhaust valves, said control means including yielding means permitting continued movement of said control means to effect adjustment of one of the valves controlled thereby after the other has reached its final position.

7. In a needle valve, a casing, a diaphragm tube and diaphragm secured to said casing, a needle slidable in said casing and having a head slidable on said tube, a distributing valve adjustable axially of said tube, said needle having a boss at the interior of the nose thereof, ports in said boss controlled by said distributing valve, and a longitudinal port in the wall of said needle affording communication between a port in said boss and the chamber formed by said diaphragm, needle, and needle head.

8. The invention as set forth in claim 7, in combination with a radial port extending through the wall of said needle and opening into said longitudinal port, and a drain port in said casing and positioned to register with said radial port when said needle is in open position.

9. In a needle valve, a casing having an outer wall and an inner cylinder, a needle movable in said cylinder, a diaphragm within said needle and supported from said casing, a needle head, said head and diaphragm cooperating with said needle and casing to provide a plurality of pressure compartments, an air vent port in the upper part of said casing, a pressure fluid vent port in the lower part of said casing, and passages in said needle opening into the respective chambers and alining with said casing ports when said needle is in fully open position, whereby all of said chambers may be vented or drained through the appropriate casing port.

10. A valve adapted to be operated by fluid pressure having in combination, pressure chambers, a flow controlling member, a cylindrical rack bar, a controlling valve on the rack bar adapted to distribute pressure fluid to the chambers and to collect exhaust fluid from the chambers, a tube in which the rack is adapted to slide, an exhaust fluid chamber defined by the tube and a reduced diameter portion of the rack, an axially movable pinion to control the rack bar extending through the exhaust fluid chamber, a port coextensive with the rack bar adapted to conduct pressure fluid to the controlling valve, a port in the rack bar to conduct exhaust fluid to the exhaust fluid chamber, and a passage adapted to conduct exhaust fluid from the exhaust fluid chamber to the exterior of the valve.

11. In a needle valve, a casing having inner and outer walls joined by radial ribs, a needle slidable in said inner wall, and means cooperating with said needle and inner wall to provide a plurality of pressure chambers, pressure and exhaust fluid passages in said casing, and a valve controlling communication between said passages and chambers, said exhaust fluid passage including a port extending longitudinally into one of said radial ribs from the outflow end of said casing.

12. In a needle valve, the combination with a casing of a needle and a diaphragm tube mounted in said casing and supporting said needle, said needle comprising a cup shaped cylinder including an integrally connected head, a detachable nose and a detachable nose cap fitted in said nose.

13. In a needle valve, the combination with a casing, a needle, pressure chambers, supply and exhaust passages for pressure fluid, and a distributing valve for controlling communication between said chambers and said passages, of an auxiliary valve in one of said passages, and control means for simultaneously adjusting said valves, said control means including relatively movable elements which permit the continued operation of said control means to effect a further adjustment of one valve when the other has reached its final position.

14. In a valve of the needle type, a casing a needle, pressure chambers, supply and exhaust passages for a pressure medium, and control means for adjusting the position of said valve mechanically and by a control of the flow of pressure medium between said chambers and passages; said control means including a distributing valve slidable in said needle for controlling said flow of pressure medium, an auxiliary valve in said exhaust passage, rotatable shaft means for simultaneously adjusting said valves and yielding means operative when one of said valves is closed to permit a continued movement of said shaft to effect a full closing adjustment of the other valve.

15. A valve comprising a casing, a needle, a needle seat, pressure chambers, supply and exhaust passages for a pressure fluid, a distributing valve for controlling communication between said pressure chambers and said passages, a shaft rotatable to adjust said distributing valve, means to move the shaft axially on rotation thereof, an auxiliary valve for closing one of said passages, said auxiliary valve being actuated by the axial movement of said shaft, and yielding means associated with said shaft to permit further rotation thereof after its axial movement is stopped by the closing of said auxiliary valve, thereby to insure an adjustment of said distributing valve which will seat said needle.

16. The invention as set forth in claim 15, wherein said means for axially moving said shaft comprises a slidably mounted nut into which said shaft is threaded, and said yielding means normally prevents sliding movement of said nut.

17. In a needle valve, the combination with a casing having an inner and outer wall defining an annular fluid passage, a needle slidably mounted in one end portion of said inner wall, a boss extending inwardly from the opposite end of said inner wall, a diaphragm tube extending into and having a radial shoulder seated against the inner end of said boss, a cap on the end of said tube for securing the same to said boss, said cap being hollow and providing a compartment for pressure fluid, a diaphragm on said tube and within said needle, and a head secured to said needle and slidable on said tube, said head and diaphragm cooperating with said needle to form two pressure chambers, of a cylindrical bar slidable in said tube, a distributing valve on said bar, rack teeth on an intermediate section of said bar, a pinion for actuating said bar, a port extending through said bar from said compartment to said distributing valve, and an exhaust port in said bar and extending from the distributing valve end thereof to the rack teeth section of said bar.

18. In a needle valve, the combination with a casing having inner and outer walls defining an annular fluid passage, a needle slidably mounted in one end portion of said inner wall, a boss extending inwardly from the opposite end of said inner wall, a diaphragm tube extending into and having a radial shoulder seated against the inner end of said boss, a cap on the end of said tube for securing the same to said boss, said cap being hollow and providing a compartment for pressure fluid, a diaphragm on said tube and within said needle, and a head secured to said needle and slidable on said tube, said head and diaphragm cooperating with said needle to form two pressure chambers, of a longitudinal port in the wall of said needle, said port providing communication between the needle nose in advance of said diaphragm and the space within said inner wall at the rear of said needle head, whereby the said space constitutes a pressure chamber.

19. The invention as set forth in claim 17, wherein said cap is provided with an opening through the wall thereof to permit fluid to enter said cap from said fluid passage.

20. In a needle valve, the combination with a casing having a needle seat and an inner shell, a needle slidable within said shell, a diaphragm within said needle, a diaphragm tube securing said diaphragm to said shell, a head on said needle and cooperating with said diaphragm to form two pressure chambers within said needle, and passages in said casing for pressure and exhaust fluid, of a control tube slidable in said diaphragm tube, said control tube including a passage communicating with each of said passages of said casing, and cooperating valve means on said control tube and said needle for regulating the supply of pressure fluid to and the exhaust of pressure fluid from the said chambers.

21. A needle valve as claimed in claim 20, wherein a portion of the said control tube at but spaced from the end remote from said needle is cut away to provide a rack, in combination with a pinion adapted to be operated from the exterior of said casing for adjusting said control tube, one of the passages in said control tube extending longitudinally through the entire length thereof and another of said passages terminating in the rack provided by said cut-away portion.

22. In a valve of the needle type and including a body, an inner shell and a diaphragm supported within the shell by a diaphragm tube, a needle member slidable on said diaphragm and within said shell, a head on said needle and slidable on said tube whereby two pressure chambers are formed within said needle, and means for supplying pressure fluid to and exhausting the same from said chambers, said means including passages in said needle and a longitudinal passage in the wall of said needle, said longitudinal passage opening into one of said first passages and into the compartment between said needle head and diaphragm.

23. A valve as claimed in claim 22 in combination with a second longitudinal passage in the wall of said needle to afford communication between the other of said first passages and the space between the needle head and the inner shell.

24. In a valve of the needle type and including a body, an inner shell and a diaphragm supported within the shell by a diaphragm tube, a needle member slidable on said diaphragm and within said shell, a head on said needle and slidable on said tube whereby two pressure chambers are formed within said needle, of a longitudinal passage in the wall of said needle, and opening into the chamber at the nose of said needle, a radial port extending outwardly from the opposite end of the said longitudinal passage, and a drain port in said casing and positioned to register with said radial port when said needle is in open position.

25. In a needle valve, a casing having horizontally alined inlet and outlet openings, a shell within said casing, a needle slidable in said shell, a diaphragm and a tube for supporting the same within said needle, a needle head slidable on said tube, whereby three tandem chambers are formed for the reception of pressure fluid, of a valve within the nose of said needle for controlling a distribution of pressure fluid to and from the chambers, a longitudinal passage in the wall of said needle to afford free communication between the end compartments, a longitudinal passage in the wall of said needle affording communication between the middle compartment and said valve, and means including a second pair of longitudinal passages in the wall of said needle for venting air and draining liquid, respectively, from said compartments.

26. In a needle valve, a casing having an inlet and an outlet opening, a shell within said casing, a needle slidable within said shell and cooperating with a seat on said casing, means cooperating with said needle to form a pair of chambers within said needle, an exhaust fluid passage formed between the said casing and shell, said passage opening into said outlet beyond the needle seat, and means including said fluid passage for supplying pressure fluid to and exhausting the same from said chambers.

PHILLIP A. KINZIE.